United States Patent [19]

Gisko et al.

[11] Patent Number: 5,332,423
[45] Date of Patent: Jul. 26, 1994

[54] VERTICAL CONTINUOUS DEGASSING APPARATUS

[76] Inventors: Jerry A. Gisko, 3725 S. East Ave., Berwyn, Ill. 60402-0515; Larry J. Farrell, 675 Grove Ter., Elk Grove, Ill. 60007

[21] Appl. No.: 929,753

[22] Filed: Aug. 12, 1992

[51] Int. Cl.$^5$ ............................................. B01D 19/00
[52] U.S. Cl. .................................. 95/248; 95/262; 95/266; 96/157; 96/194; 96/198; 96/204
[58] Field of Search ................... 55/55, 164, 189, 192, 55/215

[56] References Cited

U.S. PATENT DOCUMENTS

| | | | |
|---|---|---|---|
| 3,242,643 | 3/1966 | Moore et al. | 55/55 X |
| 3,362,132 | 1/1968 | Schellenberg | 55/164 X |
| 4,341,534 | 7/1982 | Burger | 55/55 |
| 4,999,396 | 3/1991 | Farrell . | |
| 5,024,531 | 6/1991 | Will . | |

*Primary Examiner*—Charles Hart
*Attorney, Agent, or Firm*—Thomas R. Vigil

[57] ABSTRACT

A vertical continuous degassing apparatus for degassing a mix of at least one member selected from the group consisting of a liquid, a mix of liquids, a mix of a liquid and solids and combinations thereof comprising: a vacuum chamber, a mechanism for adjusting the pressure therein, the vacuum chamber having an upper inlet zone including an inlet port, a lower discharge zone including a discharge port, and an intermediate zone therebetween. An annular skirt is positioned in the intermediate zone of the vacuum chamber for receiving, distributing and expediting the degassification of the mix entering the vacuum chamber through the upper inlet port. A vacuum seal is provided by the mix entering the inlet port and by the degassed mix exiting the discharge port.

A method for degassing a mix of at least one member selected from the group consisting of a liquid, a mix of liquids, a mix of a liquid and solids, and combinations thereof which comprise the steps of: exposing in a vacuum chamber a quantity of the mix to a vacuum to evacuate entrapped air in the mix allowing the mix to free fall by gravity in the vacuum; interrupting the free falling mix by diverting the mix outwardly; degassing the mix by forming a thin layer of film comprising the diverted mix while continuing to expose the diverted mix to the vacuum; and discharging the degassed mix.

11 Claims, 3 Drawing Sheets

VERTICAL CONTINUOUS DEGASSING APPARATUS

BACKGROUND OF THE INVENTION

1. Field of the Invention

This invention relates to a vertical continuous degassing apparatus and process for degassing a mix.

2. Description of the related art including information disclosed under 27 CFR § 1.97-1.99

Heretofore various degassification processes and apparatus have been proposed. Examples are disclosed in the following U.S. patents:

| U.S. Pat. No. | Patentee |
| --- | --- |
| 5,024,531 | Will |
| 4,999,396 | Farrell |

U.S. Pat. No. 5,024,531 discloses a device for continuous degassing of a mix of liquids and solids, such as polymer binding agents and filler materials and/or fibers. The device is substantially horizontal and includes a conveying unit, an inlet housing, which contains a mixture to be degassed, and a vacuum chamber positioned along the direction of transport of the conveying unit and at a distance from the inlet housing. A part of the conveying unit itself is designed as a metering unit.

U.S. Pat. No. 4,999,396 discloses a method for making a low resin content polymer concrete article including the steps of supplying a quantity of polymer or monomer resin, adding a non-reactive solvent, vehicle, dispersant or diluent to the resin, supplying the mixture of diluent and resin to a mixing station, supplying filler material to the mixing station, mixing the diluent, resin and filler material at the mixing station, supplying the resultant mixture to an eduction chamber, educing the non-reactive diluent from the mixture in the eduction chamber, and supplying the resulting mixture with diluent educed to a forming station for shaping and curing.

SUMMARY OF THE INVENTION

According to the present invention there is provided a vertical continuous degassing apparatus for degassing a mix of at least one member selected from the group consisting of a liquid, a mix of liquids, a mix of a liquid and solids and combinations thereof comprising a vacuum chamber, a mechanism for adjusting the pressure therein, the vacuum chamber having an upper inlet zone including an inlet port, a lower discharge zone including a discharge port, and an intermediate zone therebetween. An annular skirt is positioned in the intermediate zone of the vacuum chamber for receiving, distributing and expediting the degassification of the mix entering the vacuum chamber through the upper inlet port. A vacuum seal is provided by the mix entering the inlet port and by the degassed mix exiting the discharge port.

Further according to the present invention there is provided a method for degassing a mix of at least one member selected from the group consisting of a liquid, a mix of liquids, a mix of a liquid and solids, and combinations thereof which comprise the steps of: exposing in a vacuum chamber a quantity of the mix to a vacuum to evacuate entrapped air in the mix; allowing the mix to free fall by gravity in the vacuum; interrupting the free falling mix by diverting the mix outwardly; degassing the mix by forming a thin layer of film comprising the diverted mix while continuing to expose the diverted mix to the vacuum; and discharging the degassed mix.

DESCRIPTION OF THE PREFERRED EMBODIMENTS

Figure 1:
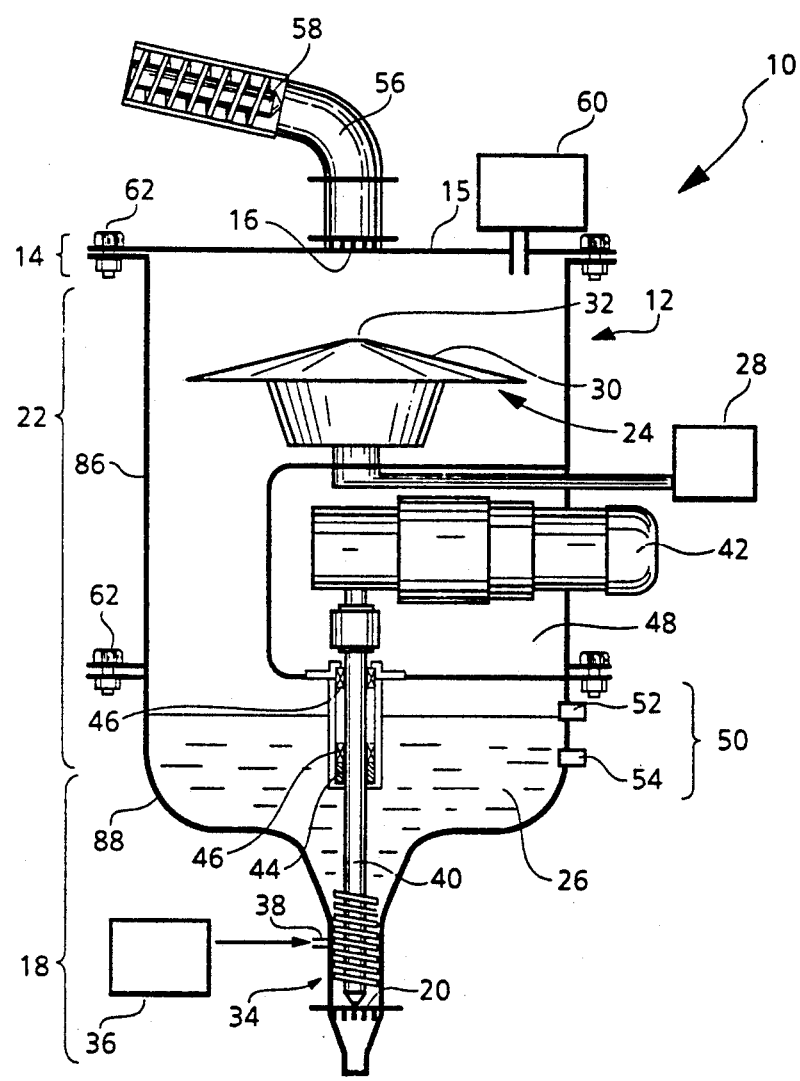
FIG. 1 is a side elevational view of a vertical continuous degassing apparatus constructed according to the teachings of the present invention with portions broken away to illustrate elements of the apparatus.
Figure 2:
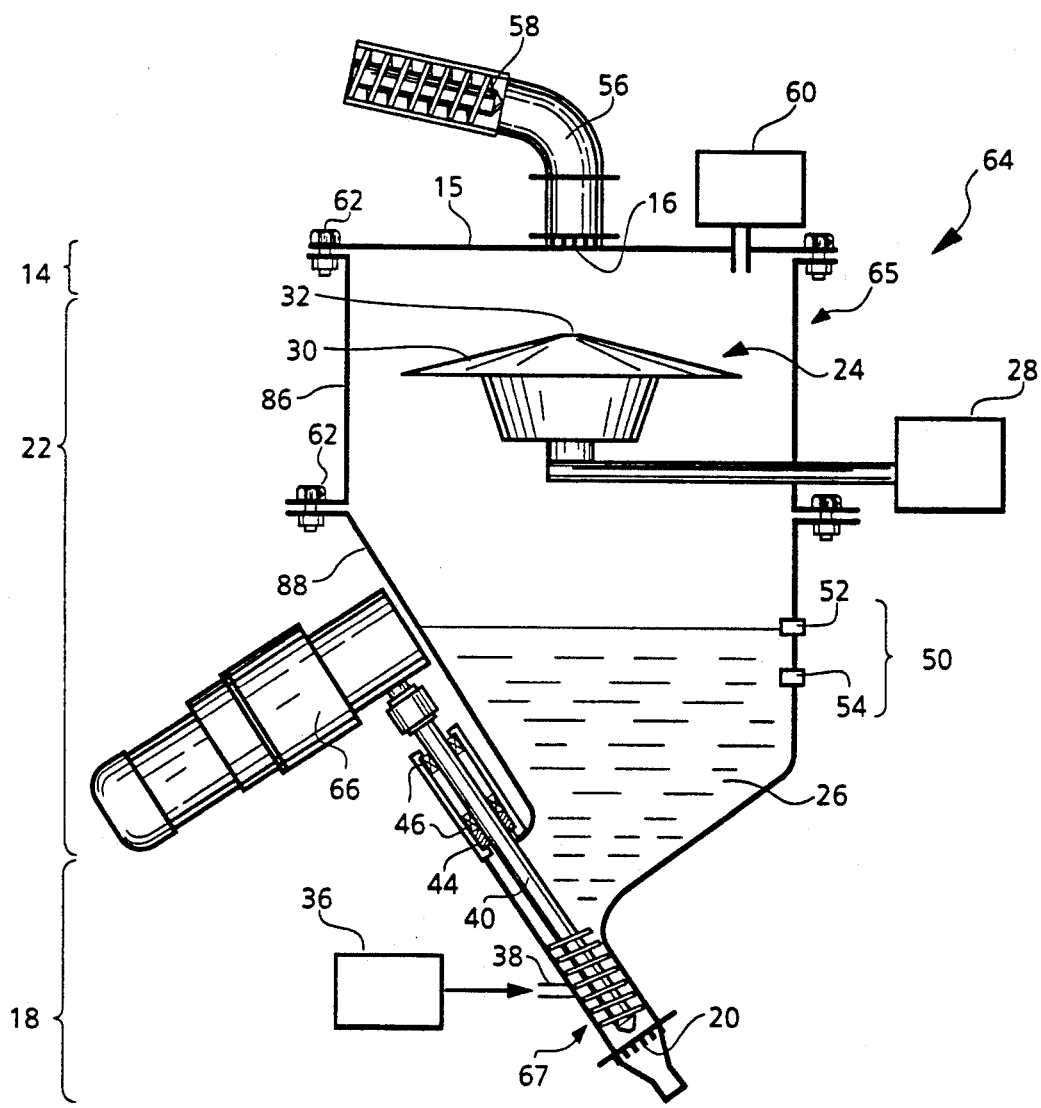
FIG. 2 is a side elevational view of one preferred embodiment of a vertical continuous degassing apparatus constructed according to the teachings of the present invention with portions broken away to show the elements of the apparatus.
Figure 3:
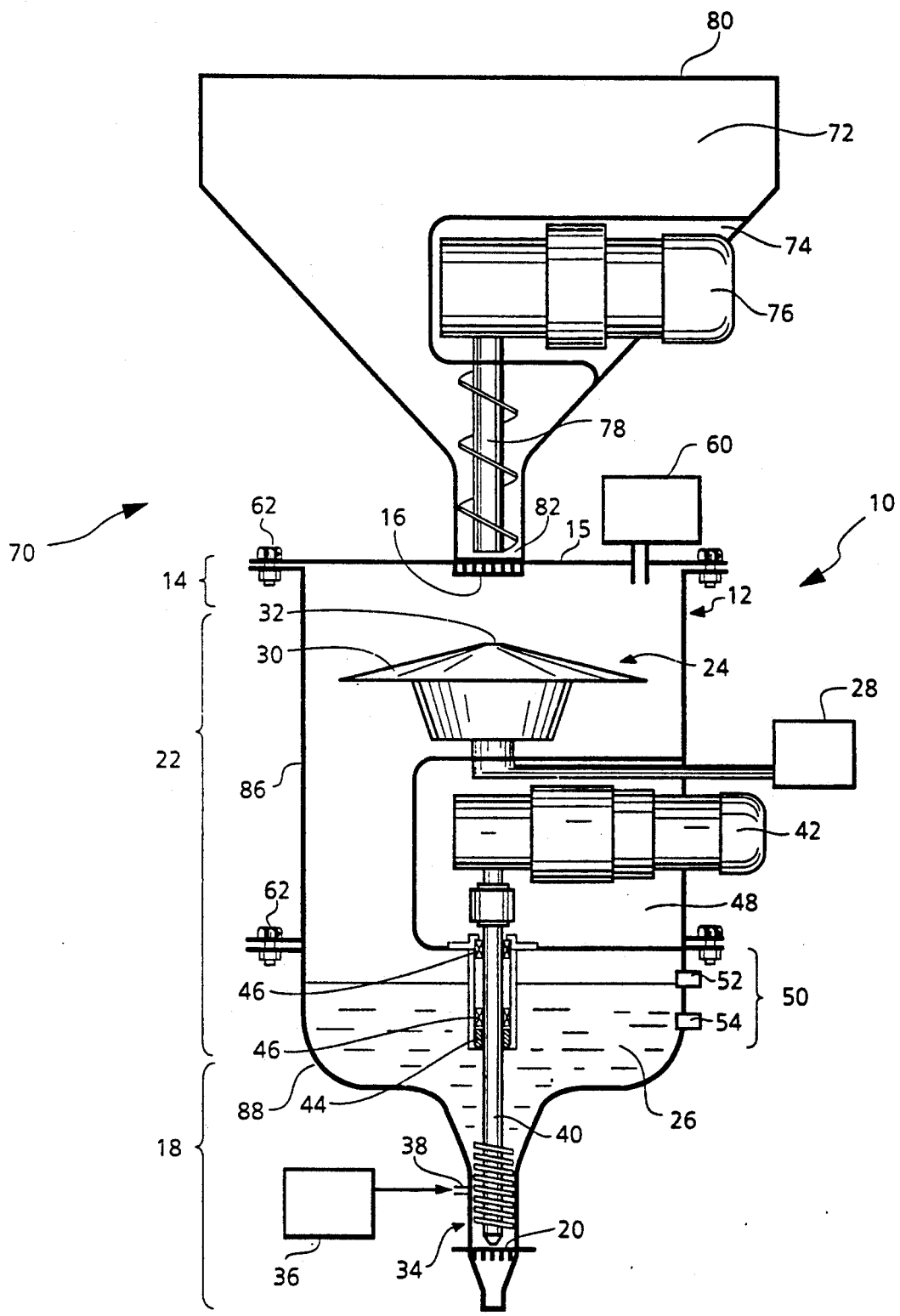
FIG. 3 is a side elevational view of a modified embodiment of the vertical continuous degassing apparatus shown in FIG. 1, and shows a mixer connected to the apparatus at an inlet port thereof.

While the degassing apparatus of this invention is susceptible of embodiments in many forms, there are shown in FIGS. 1-3, three embodiments of a degassing apparatus suitable for use in the practice of the teachings of the invention, with the understanding that the present disclosure is not intended to limit degassing apparatus to the embodiments illustrated.

Illustrated in FIG. 1, is a vertical continuous degassing apparatus 10 for degassing a mix. This apparatus 10 is particularly adapted for mixing, for example, and not limited to, a void-free or "densified" solid surface counter-top material or a void-free resin/filler mixture from which electrical insulators are made as well as a large group of materials which are well known and grouped together under the broad generic classification of polymer concrete.

The term degassing as used herein includes removing unwanted air bubbles, entrapped air, vapor or voids, in a mix.

The term mix as used herein includes a liquid alone, a mix of two or more liquids, a mix of a liquid and solids, and combinations and permutations thereof.

The degassing apparatus 10 includes a vacuum chamber 12 including an upper inlet zone 14 including a cover 15 and an inlet port 16, a lower funnel shaped discharge zone 18 including a discharge port 20 and an intermediate zone 22 between the inlet and outlet zones. The vacuum chamber 12 contains the mix under a low pressure for a period of time sufficient for it to be substantially degassed due to the low pressure therein.

The inlet and discharge ports 16 and 20 each include a series of port openings allowing the mix and degassed mix to enter and exit the apparatus 10, respectively.

The degassing apparatus 10 further includes an annular skirt 24 positioned in the intermediate zone 22 of the vacuum chamber 12 for receiving, distributing and expediting the degassification of the mix entering the vacuum chamber 12 through the upper inlet port and falling, by gravity, on the skirt 24. It should be understood by those skilled in the art, that the annular skirt 24 can have any dimensions and be of any shape. In one embodiment, the skirt 24 is conical in shape and points upwardly toward the inlet port 16, for good distribution and expeditious degassification of the mix falling thereon. Vacuum seals are provided by the mix entering the inlet port 14 and by the degassed mix 26 exiting the discharge port 20.

In one embodiment, the skirt 24 includes a mechanism 28 for vibrating the skirt for expediting the degassification of the mix falling on the skirt 24 in the chamber 12. The vibrating mechanism 28 is coupled to the skirt 24 in any conventional manner, so long as the skirt 24 vibrates freely in chamber 12. The skirt 24 includes an inlet facing surface 30 and apex 32 substantially in alignment with inlet port 16. The inlet facing surface 30 extends gradually downwardly and outwardly to direct the mix slowly outwardly to provide a broad area of exposure under vacuum on skirt 24.

Located downstream in the vacuum chamber 12, is a conveying device 34 for conveying the mix out of the discharge port 20. The conveying device 34 includes an admixing supply device 36 for admixing catalyst, colorant or other material to the degassed mix 26. The admixing device 36 has an admix inlet 38 in proximity to the discharge port 20. The conveying device 34 further includes a unitary screw conveyor 40 which is coupled to a variable transmission 42, which in turn is coupled to a motor not shown in the drawings. The conveying device 34 includes seals 44 and bearings 46 for facilitating alignment and rotation of the conveyor 40. In use, the conveyor 40 provides an intensive mixing zone in proximity to the discharge port 20.

In FIG. 1, a housing 48 in the intermediate zone 22 of the chamber 12, envelops the transmission 42 and a portion of the vibrating device 28 to keep the mix from these parts of the apparatus 10.

Also downstream of the skirt 24, is a sensor system 50 for sensing the degassed mix 26 level in the intermediate and discharge zones 18 and 20 in the chamber 12. The sensor system 50 includes a first sensor 52 and a second sensor 54 positioned on a side wall of the vacuum chamber 22, defining upper and lower desired levels of degassed mix 26 in the vacuum chamber 12. Stated another way, the sensor system 50 matches the input and output.

In one preferred embodiment, the sensor system 50 is electrically coupled to the conveying device 34 to vary the speed at which the degassed mix 26 is conveyed through the discharge port 20 as needed, thereby providing a steady inventory of degassed mix 26 in chamber 12 matched to the input of mix entering the chamber 12. For example, if the degassed mix 26 is in proximity to or rises above first sensor 52, the sensor system 50 sends a signal increasing the speed of the motor whereby the conveyor 40 rotates more rapidly, resulting in a lowering of the level of the degassed mix 26 therein to a desired level of mixing. Conversely, if the degassed mix 26 is in proximity to or below second sensor 54, the speed of the conveyor 40 is slowed down, to raise the inventory level of the degassed mix 26 in the chamber 12.

In FIG. 1, an input pipe 56 from a conventional mixing machine or source is conveyed by a screw conveyor 58 of a mixer to the inlet port 16 of the vacuum chamber 12. In one embodiment, a solid and a liquid are mixed in a mixing machine upstream of the vacuum chamber 12, and then fed through the conveyor 58 and the input pipe 56 to the vacuum chamber 12.

In one embodiment, the degassed mix 26 is admixed with a catalyst, colorant or other material, by injection of the admix through admix inlet 38. The admix supply device 36 supplies admix to the discharge zone 18 so as to allow the conveyor 40 to thoroughly mix the catalyst, colorant or other admix material to the degassed mix 26 before discharge through discharge port 20.

When making a reactive mixture for example, a preferred catalyst is selected from at least one member of the group consisting of methyl ethyl ketone peroxide (MEKP), BPO, AAP and CHP, and most preferably MEKP, as is well known in the field of polyester resins. In such a case, it is important that a non-reactive, dispersant, vehicle, solvent or diluent be utilized so there is no reaction with any constituent of the mixture.

A vacuum device 60 is coupled to the chamber 12 to provide a vacuum for exposing the mix to sufficient residence time for degassing of unwanted air bubbles, entrapped air, vapors or voids in such mix. In one embodiment, in a closed system the vacuum device 60 can be utilized to remove volatile by-products.

The vacuum chamber 12 is modular, and therefore can be easily installed and maintained. For example, the various components of chamber 12 interconnect and attach with fasteners 62, such as screws and bolts. The chamber 12 includes the cover 15, and a cylinder 86 having a curved bottom wall 88 connected by fasteners 62 for easy installation, improved maintenance and assembly. In one embodiment, the cover 15 is substantially flat and has inlet port 16 and an opening for connection to the vacuum device 60. The cylinder 86 has the housing 48 mounted therein for coupling of the vibrating device 28 and the transmission 42 to the conveying device 34. The bottom wall 86 is funnel shaped, and has the admix inlet 38 and the discharge port 20 therein.

A method for using the apparatus 12 includes the first step of exposing a quantity of the mix to a vacuum in the vacuum chamber 12 to evacuate entrapped air, vapor and voids in the mix. Next, the mix is allowed to free fall by gravity in the vacuum toward the skirt 24. Thereafter, the free falling mix is interrupted by the skirt 24 and diverted slowly outwardly and downwardly on the inlet facing surface 30 of the skirt 24, providing a fixed residence time of a shallow slow moving broad area or volume of the mix while the mix is continuously degassed by being exposed to the vacuum. Next, the degassed mix falls due to gravity from the skirt 24 toward the discharge zone 18 and is discharged through the discharge port 20.

Advantageously, this method provides a long residence time of the mix under vacuum in the vacuum chamber 12, while providing several degassing phases. For example, the free falling mix from inlet port 16 to skirt 24, includes degassing due to the vacuum exposure and the fact that some vapors and voids are eliminated from the mix while falling and while being exposed to the vacuum. The second phase includes substantial degassing when the free falling mix is interrupted by the skirt 24 and diverted slowly outwardly and downwardly, thereby forming a thin layer or film comprising the diverted mix. The diverted mix includes a broad area of exposure on inlet facing surface 30, resulting in substantial degassing because the vapors, air, gases and voids, in a shallow mix are easily pulled out and removed due to exposure to the vacuum, while the mix is flowing slowly downwardly and outwardly.

The third phase of degassing includes the degassing which occurs when the mix free falls from the skirt 24 by gravity, toward the discharge zone 18. In this phase, some vapors, voids, etc. are removed due to the free falling of the mix and continued exposure to the vacuum.

The fourth phase of degassification includes evaporation and removal of entrained vapor, air, gases, voids, etc. while the degassed mix is in inventory in the intermediate and discharge zones 22 and 18, due to the continual exposure to the vacuum.

In one preferred embodiment, the second phase of the degassing step includes vibrating the diverted thin layer of the mix on skirt 24, thereby shaking the bubbles and gas out of the mix, enhancing the degassification while on skirt 24 and in chamber 12.

Also in one embodiment, the discharging step of the degassing method includes sensing the level of the degassed mix 26 in inventory in the chamber 12 and conveying and discharging the degassed mix out of the chamber 12 in response to the sensed level of the degassed mix 26 sensed therein. More particularly, this is done by the sensor system 50 sensing the level therein and speeding up or slowing down the rate of discharge by varying the speed of the conveying device 34 to ensure a steady state of inventory in the chamber 12.

In FIG. 2, a preferred degassing apparatus 64 is illustrated. The degassing apparatus 64 is advantageous because it includes a larger volume vacuum chamber 65 than the volume of the vacuum chamber 12 shown in FIG. 1, providing a longer residence time for the mix therein, if desired. The degassing apparatus 64 includes a vibrating device 28 coupled to the skirt 24, which takes up a small volume in the vacuum chamber 65. The degassing apparatus 64 includes a variable transmission 66 coupled to an inclined conveying device 67 which is aligned with the discharge port 20. This design allows for ease of maintenance, access and service, by the transmission 66 outside of the chamber 65. In all other respects, the apparatus 64 has substantially the same elements as the apparatus 12, which elements are identified with the same reference numerals in FIG. 2 as are used in the embodiment shown in FIG. 1.

Referring to FIG. 3, a stand alone degassing apparatus 70 is illustrated therein. The stand alone degassing apparatus 70 includes the degassing apparatus 10 and a generally funnel shaped mixer 72 mounted on the cover 15 and including a housing 74 formed therein providing a transmission 76 coupled to a screw conveyor 78 mounted in the mixer 72. The stand alone apparatus 70 further includes an inlet 80 open to the atmosphere, for receiving mix and an outlet 82 which leads into the inlet port 16. In the mixer 72 a solid and liquid are combined to form a mix and the mix is fed to the vacuum chamber 12. In the chamber 12, the mix is exposed to the four phase degassification method described above with respect to FIGS. 1 and 2.

The degassing apparatus 10, 64 and 70 of this invention is particularly adapted to mixing liquids and solids, such as but not limited to a polymeric binding agent with filler material and/or fiber.

Although specific embodiments of the degassing apparatus of this invention have been shown and described, it is to be understood that various modifications and substitutions, as well as rearrangements and combinations of the preceding embodiments, can be made by those skilled in the art without departing from the teachings of the invention.

I claim:

1. A vertical continuous degassing apparatus for degassing a mix of polymer concretes, solid surface materials and densified materials containing void producing gases comprising:
   a vacuum chamber;
   a mechanism for adjusting the pressure therein;
   the vacuum chamber having an upper inlet zone including an inlet port, a lower discharge zone including a discharge port, and an intermediate zone therebetween;
   means positioned in the intermediate zone of the vacuum chamber for receiving, distributing and expediting the degassification of the mix entering the vacuum chamber through the upper inlet port;
   means for vibrating said means for receiving, distributing and expediting the degassification; and
   a vacuum seal provided by the mix entering the inlet port and by the degassed mix exiting the discharge port.

2. The apparatus of claim 1, wherein said means for vibrating, distributing and expediting includes a skirt for expediting the degassification of the mix in said chamber.

3. The apparatus of claim 2, wherein said skirt includes an inlet facing surface which extends substantially downwardly and outwardly to direct the mix outwardly.

4. The apparatus of claim 2, wherein said skirt is generally conically shaped including an apex and an inlet facing surface which extends substantially downwardly and outwardly.

5. The apparatus of claim 1, wherein said upper inlet port of said vacuum chamber is substantially axially aligned with respect to said skirt.

6. The apparatus of claim 1, further comprising conveying means for conveying the degassed mix out of said discharge port.

7. The apparatus of claim 6, wherein said conveying means includes means for admixing catalyst, colorant or other material to the degassed mix, said admixing means having inlet means to said discharge zone for introducing said catalyst, colorant, or other material in the discharge zone.

8. The apparatus of claim 1, further comprising:
   sensor means for sensing the mix level in said chamber; and
   conveying means for conveying the degassed mix out of the discharge port including a unitary screw conveyer in substantial alignment with said discharge port, said sensor means being electrically coupled to said conveying means for effecting continuous conveyance of said degassed mix through the discharge port.

9. A method for degassing a mix of at least one member selected from the group consisting of a liquid, a mix of liquids, a mix of a liquid and solids, and combinations thereof comprising the steps of:
   (a) exposing in a vacuum chamber a quantity of the mix to a vacuum to evacuate entrapped air or gases in the mix;
   (b) allowing the mix to free fall by gravity in the vacuum;
   (c) interrupting the free falling mix by diverting the mix outwardly;
   (d) degassing the mix by forming a thin layer of film comprising the diverted mix and vibrating and oscillating the diverted thin layer of the mix, while continuing to expose the diverted mix to the vacuum; and
   (e) discharging the degassed mix.

10. A method for degassing a mix of at least one member selected from the group consisting of a liquid, a mix of liquids, a mix of a liquid and solids, and combinations thereof comprising the steps of:
(a) exposing in a vacuum chamber a quantity of the mix to a vacuum to evacuate entrapped air or gases in the mix;
(b) allowing the mix to free fall by gravity in the vacuum;
(c) interrupting the free falling mix by diverting the mix outwardly;
(d) degassing the mix by forming a thin layer of film comprising the diverted mix while continuing to expose the diverted mix to the vacuum;
(e) admixing a catalyst, colorant or material to the degassed mix; and
(f) discharging the degassed mix.

11. A method for degassing a mix of at least one member selected from the group consisting of a liquid, a mix of liquids, a mix of a liquid and solids, and combinations thereof comprising the steps of:
(a) exposing in a vacuum chamber a quantity of the mix to a vacuum to evacuate entrapped air or gases in the mix;
(b) allowing the mix to free fall by gravity in the vacuum;
(c) interrupting the free falling mix by diverting the mix outwardly;
(d) degassing the mix by forming a thin layer of film comprising the diverted mix while continuing to expose the diverted mix to the vacuum; and
(e) sensing the level of the degassed mix in the chamber and conveying and discharging the degassed mix in response to the sensed level of degassed mix therein.

* * * * *